(12) United States Patent
Xie

(10) Patent No.: US 11,907,283 B2
(45) Date of Patent: Feb. 20, 2024

(54) MULTI-RESOLUTION RASTER DATA ACCESS METHOD, APPARATUS, ELECTRONIC DEVICE, AND COMPUTER STORAGE MEDIUM

(71) Applicant: Alibaba Group Holding Limited, Grand Cayman (KY)

(72) Inventor: Jiong Xie, Beijing (CN)

(73) Assignee: Alibaba Group Holding Limited

( * ) Notice: Subject to any disclaimer, the term of this patent is extended or adjusted under 35 U.S.C. 154(b) by 42 days.

(21) Appl. No.: 17/534,171

(22) Filed: Nov. 23, 2021

(65) Prior Publication Data

US 2022/0083586 A1    Mar. 17, 2022

Related U.S. Application Data

(63) Continuation of application No. PCT/CN2020/091524, filed on May 21, 2020.

(30) Foreign Application Priority Data

May 30, 2019    (CN) .......................... 201910463161.7

(51) Int. Cl.
*G06F 16/00*     (2019.01)
*G06F 16/532*    (2019.01)
(Continued)

(52) U.S. Cl.
CPC ............ *G06F 16/532* (2019.01); *G06F 16/51* (2019.01); *G06T 3/40* (2013.01); *G06T 11/40* (2013.01); *H04N 19/59* (2014.11)

(58) Field of Classification Search
None
See application file for complete search history.

(56) References Cited

U.S. PATENT DOCUMENTS 5,767,987 A     6/1998  Wolff et al.
5,774,598 A *   6/1998  Sunshine ............. H04N 19/176
                                                 375/E7.206
(Continued)

FOREIGN PATENT DOCUMENTS

CN      101470730 A    7/2009
CN      101667200 A    3/2010
(Continued)

OTHER PUBLICATIONS

Nebiker, Stephan, and Lukas Relly. "Concepts and system architectures for the management of very large spatial raster objects in a database framework." Gis-Heidelberg—12 (1999): 4-11. (Year: 1999).*

(Continued)

*Primary Examiner* — Polina G Peach
(74) *Attorney, Agent, or Firm* — Lee & Hayes, P.C.

(57) ABSTRACT

A method, an apparatus, an electronic device, and a computer storage medium for accessing raster data are provided. The raster data access method comprises: executing a corresponding window query input to determine a target pixel resolution corresponding to a query window according to a raster data access request; calculating a sampling level according to the target pixel resolution and a stored pixel resolution of a raster object, and determining whether the sampling level is greater than a threshold; and accessing raster data corresponding to the query window according to a column-level index if the sampling level is greater than the threshold, the column-level index being an index generated by down-sampling according to raster data of the raster object in a column. Using the raster data access method can achieve quick access to raster data.

17 Claims, 9 Drawing Sheets

(51) Int. Cl.
  *G06F 16/51* (2019.01)
  *G06T 3/40* (2006.01)
  *H04N 19/59* (2014.01)
  *G06T 11/40* (2006.01)
  *G06F 16/30* (2019.01)

(56) References Cited

U.S. PATENT DOCUMENTS

| | | | | |
|---|---|---|---|---|
| 5,778,158 | A * | 7/1998 | Fujii | G06T 3/4023 |
| | | | | 358/1.1 |
| 7,412,003 | B2 * | 8/2008 | Fernandes | H04N 19/40 |
| | | | | 348/402.1 |
| 7,965,902 | B1 * | 6/2011 | Zelinka | G06F 16/51 |
| | | | | 382/284 |
| 8,576,238 | B1 | 11/2013 | Brandt | |
| 9,357,144 | B2 | 5/2016 | Hara et al. | |
| 9,877,031 | B2 * | 1/2018 | Mann | H04N 21/85406 |
| 10,102,219 | B2 | 10/2018 | Ebberson et al. | |
| 10,789,231 | B2 * | 9/2020 | Infante Suarez | G06F 16/2246 |
| 10,890,663 | B2 * | 1/2021 | Shroff | G01S 17/06 |
| 11,204,896 | B2 * | 12/2021 | Albrecht | G06F 16/173 |
| 11,422,259 | B2 * | 8/2022 | Shroff | G01C 21/3837 |
| 2004/0096122 | A1 * | 5/2004 | Curry | G06V 30/413 |
| | | | | 382/302 |
| 2004/0117358 | A1 * | 6/2004 | von Kaenel | G06Q 40/08 |
| 2005/0055376 | A1 | 3/2005 | Xie et al. | |
| 2005/0058203 | A1 * | 3/2005 | Fernandes | H04N 19/56 |
| | | | | 375/240.2 |
| 2006/0221077 | A1 * | 10/2006 | Wright | G06T 3/4023 |
| | | | | 345/428 |
| 2007/0253642 | A1 * | 11/2007 | Berrill | G06F 16/29 |
| | | | | 382/199 |
| 2009/0317010 | A1 | 12/2009 | Gerhard et al. | |
| 2010/0020241 | A1 * | 1/2010 | Takeshima | G06T 3/4069 |
| | | | | 348/E5.051 |
| 2012/0054195 | A1 * | 3/2012 | Hu | G06F 16/2264 |
| | | | | 707/743 |
| 2012/0313972 | A1 * | 12/2012 | Cao | G06F 16/51 |
| | | | | 345/660 |
| 2013/0216096 | A1 | 8/2013 | Miyama | |
| 2015/0379734 | A1 * | 12/2015 | Golas | G06T 15/005 |
| | | | | 345/597 |
| 2017/0185823 | A1 * | 6/2017 | Gold | G01C 21/206 |
| 2017/0337229 | A1 * | 11/2017 | Infante Suarez | G06F 16/2246 |
| 2018/0063547 | A1 * | 3/2018 | Kobayashi | G06T 7/238 |
| 2018/0158227 | A1 * | 6/2018 | Reshetov | G06T 7/13 |
| 2018/0182066 | A1 | 6/2018 | Saleh et al. | |
| 2018/0197304 | A1 * | 7/2018 | Golas | G06T 7/30 |
| 2018/0213182 | A1 | 7/2018 | Kim | |
| 2019/0206122 | A1 * | 7/2019 | Zhan | G06T 17/005 |
| 2019/0363117 | A1 * | 11/2019 | Li | G01T 1/208 |
| 2020/0296380 | A1 * | 9/2020 | Aono | H04N 19/593 |
| 2020/0368616 | A1 * | 11/2020 | Delamont | H04N 13/239 |

FOREIGN PATENT DOCUMENTS

| | | |
|---|---|---|
| CN | 101763416 A | 6/2010 |
| CN | 102368272 A | 3/2012 |
| CN | 108319655 A | 7/2018 |

OTHER PUBLICATIONS

Hornung, Armin, et al. "OctoMap: An efficient probabilistic 3D mapping framework based on octrees." Autonomous robots 34 (2013): 189-206. (Year: 2013).*

Translation of CN 1st Office Action for corresponding CN application No. 201910463161.7 dated May 30, 2019, 7 pages.

Translation of PCT Office Action and Search Report for corresponding PCT application No. PCT/CN2020/091524 dated Dec. 3, 2020, 6 pages.

* cited by examiner

MULTI-RESOLUTION RASTER DATA ACCESS METHOD, APPARATUS, ELECTRONIC DEVICE, AND COMPUTER STORAGE MEDIUM

CROSS REFERENCE TO RELATED PATENT APPLICATIONS

This application claims priority to and is a continuation of PCT Patent Application No. PCT/CN2020/091524 filed on 21 May 2020, and is related to and claims priority to Chinese Application No. 201910463161.7, filed on 30 May 2019 and entitled "Raster Data Access Method, Apparatus, Electronic Device, and Computer Storage Medium," which are incorporated herein by reference in their entirety.

TECHNICAL FIELD

The present disclosure relates to the field of computer technology, and in particular, to methods, apparatuses, electronic devices, and computer storage media for accessing raster data.

BACKGROUND

Raster data is a general term for a type of data, which stores data in a pixel matrix structure, and is usually used for storing geospatial data. It includes various types of data forms, such as remote sensing images, DEM (digital elevation model), GRID, etc.

A so-called raster data type is an extended field type that is specially introduced for the need of storing raster data in addition to conventional field data types such as Int (integer), Varchar (string), etc.

When raster data is stored through a database system, a user only needs to define a column in a data table as a field of a raster data type. The raster data can then be stored in that column, and each row therein stores raster data corresponding to a raster object. An add operation, a delete operation, a change operation, and a search operation on the raster data of the raster object are implemented by executing corresponding operators.

Conventional database systems only support multi-resolution fast accesses at a raster object level. When a multi-resolution access is performed on raster data in all raster objects stored in a data table, multiple raster objects need to be accessed as a scale of the access increases, leading to a large number of small object accesses, causing a degradation in access performance, and affecting access speed.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/ computer-readable instructions as permitted by the context above and throughout the present disclosure.

Accordingly, embodiments of the present disclosure provide solutions of raster data accesses to solve some or all of the above-mentioned problems.

According to the embodiments of the present disclosure, a method for accessing raster data is provided, which includes: executing a corresponding window query input to determine a target pixel resolution corresponding to a query window according to a raster data access request; calculating a sampling level and determining whether the sampling level is greater than a threshold according to the target pixel resolution and pixel resolution(s) of stored raster object(s); and accessing raster data corresponding to the query window according to a column-level index if greater, the column-level index being an index generated by down-sampling according to raster data of the raster object(s) in columns.

According to the embodiments of the present disclosure, an apparatus for accessing raster data is provided, which includes: a determination module, configured to execute a corresponding window query input to determine a target pixel resolution corresponding to a query window according to a raster data access request; a judging module configured to calculate a sampling level and determine whether the sampling level is greater than a threshold according to the target pixel resolution and pixel resolution(s) of stored raster object(s); a first access module configured to access raster data corresponding to the query window according to a column-level index if greater, the column-level index being an index generated by down-sampling according to raster data of the raster object(s) in columns.

According to the embodiments of the present disclosure, an electronic device is provided, which includes: a processor, a memory, a communication interface, and a communication bus, the processor, the memory, and the communication interface completing inter-communications with each other through the communication bus; and the memory being configured to store at least one executable instruction that causes the processor to perform operations corresponding to the method for accessing raster data as described in the first aspect.

According to the embodiments of the present disclosure, a computer storage medium, on which a spatial database is stored, is provided. The spatial database includes a spatial data table and a column-level index. At least one field of the spatial data table is used for storing raster data of raster object(s), and the column-level index is an index generated by down-sampling according to the raster data in the at least one field.

According to the embodiments of the present disclosure, a computer storage medium having a computer program stored thereon is provided. When the program is executed by a processor, the method for accessing raster data as described in the first aspect is implemented.

According to the solutions of raster data accesses provided by the embodiments of the present disclosure, a target pixel resolution of a query window is determined according to a raster data access request, and a sampling level is calculated according to the target pixel resolution and pixel resolution(s) of raster object(s). A determination of whether a column-level index needs to be accessed according to a size relationship between the sampling level and the threshold is made. When the sampling level is greater than the threshold, raster data corresponding to the query window is accessed according to the column-level index, which improves the access speed of multiple pieces of raster data in a column, and achieves a fast access to massive raster data at any scale.

BRIEF DESCRIPTION OF THE DRAWINGS

In order to explain the technical solutions in the embodiments of the present disclosure or existing technologies more clearly, drawings that need to be used in the description of the embodiments or the existing technologies will be briefly introduced as follows. Apparently, the drawings in the following description merely represent some embodiments described in the embodiments of the present disclosure. For one of ordinary skill in the art, other drawings can be obtained from these drawings.

DETAILED DESCRIPTION

In order to enable one skilled in the art to better understand the technical solutions in the embodiments of the present disclosure, the technical solutions in the embodiments of the present disclosure will be clearly and completely described hereinafter with reference to the accompanying drawings in the embodiments of the present disclosure. Apparently, the described embodiments represent only a part and not all of the embodiments of the present disclosure. Based on the embodiments in the embodiments of the present disclosure, all other embodiments obtained by one of ordinary skill in the art should fall within the scope of protection of the embodiments of the present disclosure.

Specific implementations of the embodiments of the present disclosure will be further described below in conjunction with the accompanying drawings of the embodiments of the present disclosure.

Figure 1:
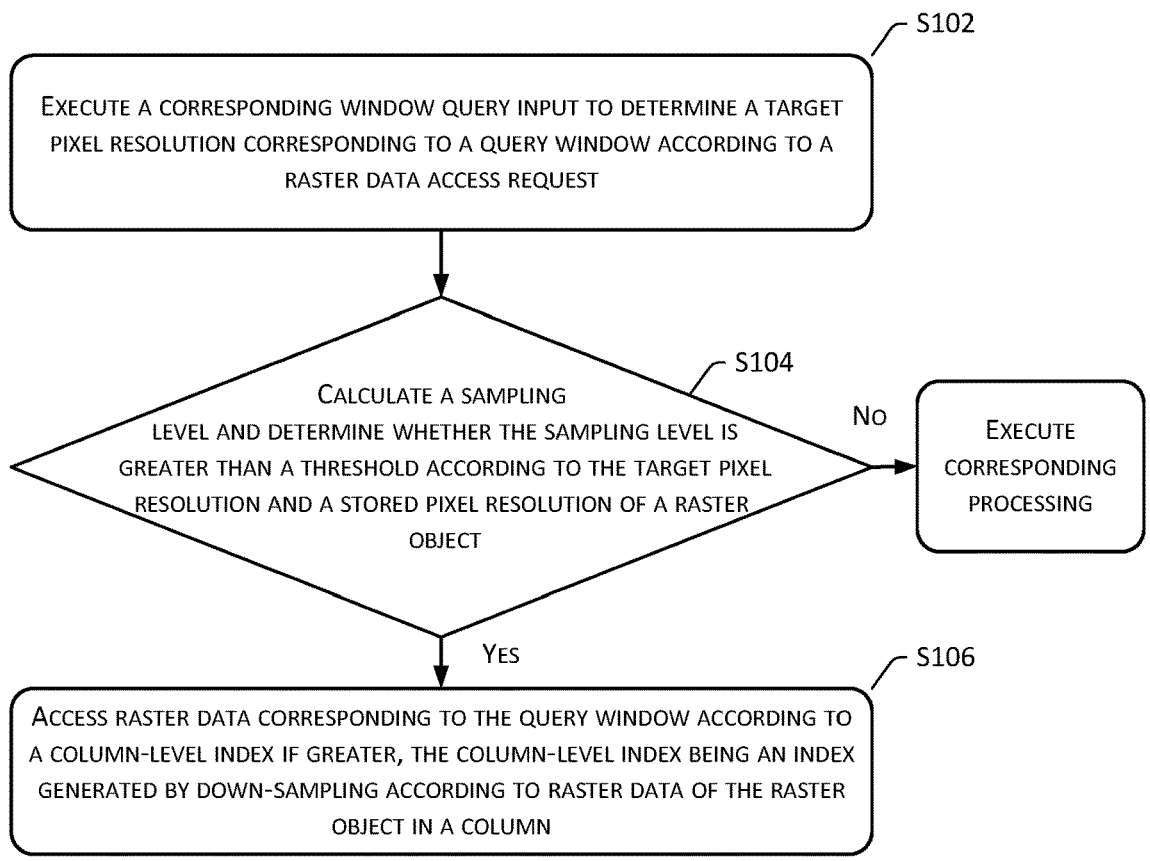
FIG. 1 is a flowchart of a method for accessing raster data according to the present disclosure.

Referring to FIG. 1, a flowchart of a raster data access method 100 according to the present disclosure is shown.

The raster data access method 100 includes the following steps:

Step S102: Execute a corresponding window query input to determine a target pixel resolution corresponding to a query window according to a raster data access request.

In this embodiment, the raster data access method is used in a spatial database system to improve the efficiency of accessing raster data therein. In other embodiments, the method can be applied to any other database system that stores raster data, for example, applied to a database system that is used for storing paintings.

The spatial database system uses raster data to store geospatial data. For example, a spatial data table is stored in a spatial database system, and a field type of a certain column in the spatial data table is a raster data type, which is used to store data corresponding to a raster object. One skilled in the art can select an appropriate storage method for raster objects as needed.

For example, a storage method is: using each row in a raster column whose data type is a raster data type to store a raster object (such as a remote sensing image). If necessary, metadata of the raster object and an index is stored in a row, and raster data (i.e., a pixel matrix) corresponding to the raster object can be directly stored in an original raster file, which can reduce data redundancy.

For another example, another storage method is: storing metadata of a raster object in a row of a spatial data table, generating an in-row index according to a pixel matrix of the raster object, and storing the pixel matrix in an in-row index table in a form of a raster block based on the in-row index.

In this embodiment, when a user performs a window query access to a spatial data table, a raster data access request is triggered to request access to raster data of a raster object in a query window. Apparently, a database system can be configured with different service logics according to different service requirements. A raster data access request can be triggered in any appropriate method, which is not limited in this embodiment.

According to the raster data access request, a corresponding window query input can be executed to determine a target pixel resolution corresponding to the query window. In different services, the meaning indicated by the target pixel resolution may be different. For example, in a spatial data table, the target pixel resolution is used to indicate an actual geographic area corresponding to each pixel in the query window.

For one skilled in the art, the target pixel resolution can be determined according to the executed window query input in an appropriate method as needed, which is not limited in this embodiment.

Step S104: Calculate a sampling level and determine whether the sampling level is greater than a threshold according to the target pixel resolution and a stored pixel resolution of a raster object.

The stored pixel resolution of the raster object is used to indicate an actual geographic area corresponding to a pixel in the raster object. For example, if the pixel resolution of the raster object is 1 meter, this means that the pixel indicates a surface feature with a range of 1 square meter.

According to the target pixel resolution (denoted as f) and the pixel resolution of the raster object (denoted as g), a sampling level (denoted as lv) can be calculated. In this embodiment, the sampling level lv is used to indicate a proportional relationship between the target pixel resolution f and the pixel resolution g of the raster object. The sampling level lv can be calculated in any suitable way.

For example, a ratio of the target pixel resolution f to the pixel resolution g of the raster object is calculated, and a logarithmic value of the ratio to a base 2 is obtained. The logarithmic value is rounded as the sampling level lv. In this manner, the sampling level lv can be expressed as: $lv=\log 2 (f\_x/g\_x)$, where $f\_x$ is a target pixel resolution of the x-axis of the query window, and $g\_x$ is a pixel resolution of the x-axis of the raster object. Alternatively, the sampling level lv may also be calculated based on a target pixel resolution of the y-axis of the query window and a pixel resolution of the y-axis of the raster object.

Apparently, in other embodiments, for different service requirements, the sampling level lv may indicate other meanings, and one skilled in the art may use other appropriate methods to calculate the sampling level lv.

According to the calculated sampling level lv, a determination can be made as to whether it is necessary to access raster data of more than one raster object by determining whether the sampling level is greater than a threshold. If the sampling level lv is greater than the threshold, step S106 is executed. If the sampling level lv is not greater than the threshold, this means that only raster data access at a raster object level is needed. In this case, existing methods can be used to access the raster data, such as a direct access to raster data stored in a row of the raster object.

It should be noted that, depending on a configuration of the spatial data table, the threshold may be any appropriate value. For example, if a row-level index is generated in the spatial data table based on raster data of raster objects in rows, the threshold can be configured as a level of the row-level index (such level is a level of the row-level index). For example, a root node of the row-level index is level 1, and a leaf node is level 1, and the level is 3 if there is a layer of intermediate nodes between the root node and the leaf node). Alternatively, if the raster data of the raster object is stored in a form of an original raster file, and the row-level index is not set in the spatial data table, one skilled in the art can configure the threshold to any appropriate set threshold as needed. For example, the threshold can be set to 0.

Step S106: Access raster data corresponding to the query window according to a column-level index if greater, the column-level index being an index generated by down-sampling according to raster data of the raster object in a column.

The column-level index is an index generated according to the raster data of the raster object in the column. One skilled in the art can use an appropriate method to generate the column-level index as needed. By configuring the column-level index, raster data corresponding to a query window can be accessed according to the column-level index when a large-scale window query (i.e., a sampling level lv is greater than the threshold) is needed, to increase the access speed when multi-resolution accesses are executed for multi raster objects, reduce performance degradation, and improve the performance of query accesses.

In this embodiment, the column-level index is generated by down-sampling according to raster data of the raster objects in the column. Down-sampling refers to an operation of sampling a pixel matrix with a larger dimension to obtain a pixel matrix with a smaller dimension. For example, a pixel matrix of 256 pixels*256 pixels is obtained from a pixel matrix of 512 pixels*512 pixels through a sampling algorithm. Since the column-level index is generated by down-sampling, a data volume of the column-level index itself can be controlled to be relatively small, and the speed of creating the column-level index can be made faster, so that the resource overhead can be controlled.

Through this embodiment, according to a raster data access request, a target pixel resolution of a query window is determined, and a sampling level is calculated according to the target pixel resolution and a pixel resolution of a raster object. A determination is made about whether a column-level index is needed to be accessed based on a relationship between the sampling level and a threshold. When the sampling level is greater than the threshold, raster data corresponding to the query window is accessed according to the column-level index, which improves the access speed of multiple pieces of raster data in a column and realizes quick access of massive raster data at any scale.

The raster data access method of this embodiment can be executed by any appropriate electronic device with data processing capabilities, which includes, but is not limited to: a server, a mobile terminal (such as a tablet computer, a mobile phone, etc.), and a PC, etc.

Figure 2:
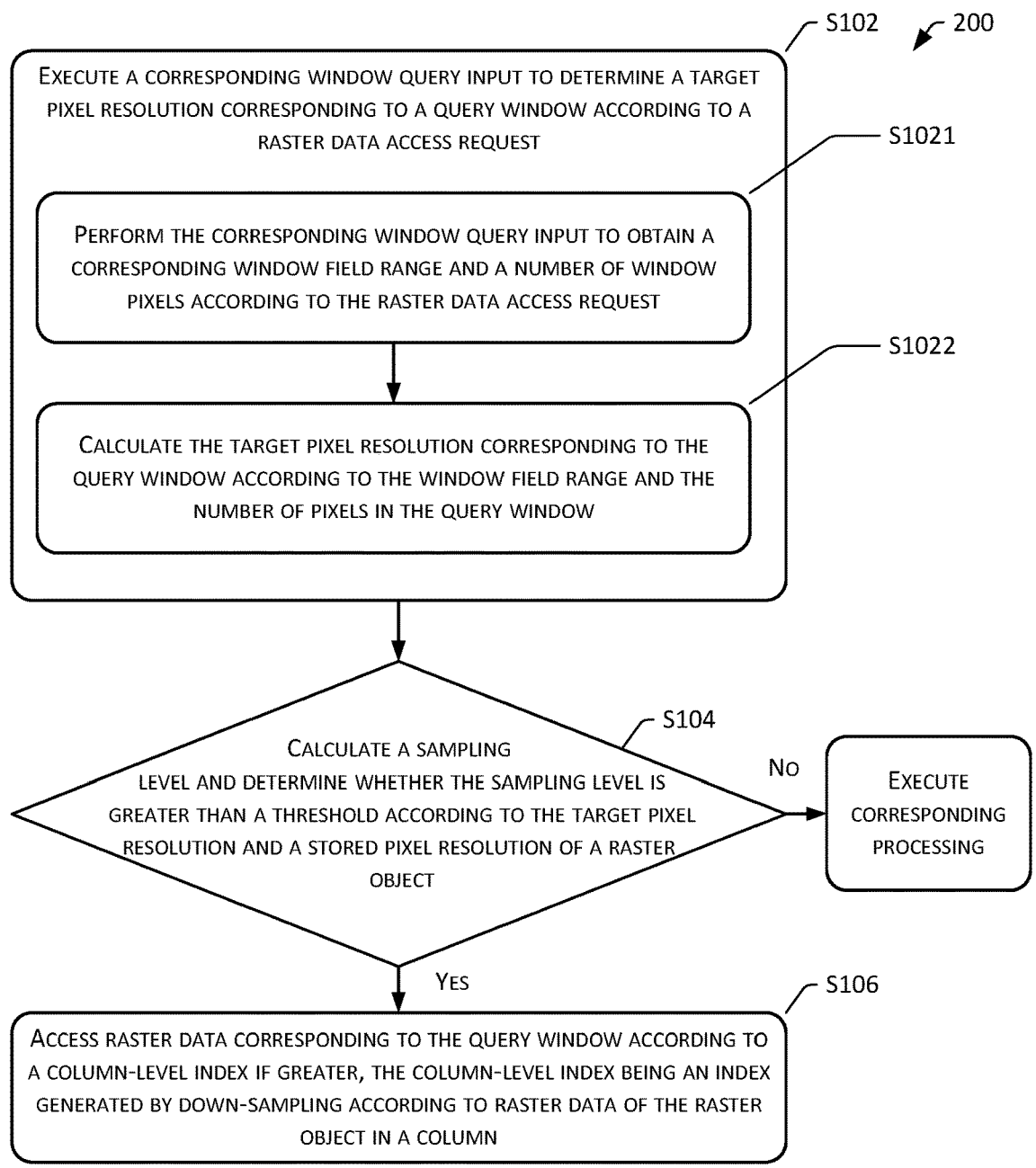
FIG. 2 is a flowchart of a method for accessing raster data according to the present disclosure.

Referring to FIG. 2, a flowchart of a raster data access method 200 according to the present disclosure is shown.

The raster data access method 200 includes the aforementioned steps S102 to S106.

Step S102 includes the following sub-steps:

Sub-step S1021: Perform the corresponding window query input to obtain a corresponding window field range and a number of window pixels according to the raster data access request.

In this embodiment, when a raster data access request is triggered, a corresponding window query input is executed to obtain a window field range (denoted as e) and a number of window pixels (denoted as p) of a query window.

The window field range e is used to indicate an area of an actual geographic space corresponding to the query window. In this embodiment, coordinates of the upper left corner and the lower right corner of the query window are used to represent the window field range e of the query window, which is denoted as $e=(ul\_x, ul\_y), (lr\_x, lr\_y)$. In other embodiments, other ways may be used to represent the window field range e of the query window.

The number of window pixels p is used to indicate the number of pixels corresponding to the query window on a display device. In this embodiment, the number of pixels p in the query window is represented by the number of pixels in the x-axis direction and the number of pixels in the y-axis direction, which is denoted as $p=(cell\_count\_x, cell\_count\_y)$. In other embodiments, the number p of window pixels of the query window may be expressed in other ways.

Apparently, in other embodiments, according to different service requirements, executing the corresponding window query input can obtain other information that can characterize the query window, which is not limited in this embodiment.

Sub-step S1022: Calculate the target pixel resolution corresponding to the query window according to the window field range and the number of pixels in the query window.

In a first feasible method, a process of calculating the target pixel resolution f corresponding to the query window is: calculating the x-axis length of the query window according to the window field range e, determining the number of pixels on the x-axis of the query window according to the number of window pixels p, calculating a ratio of the length of the x-axis of the query window to the number of pixels on the x-axis of the query window, and determining the ratio as the target pixel resolution f.

In this method, the target pixel resolution f can be expressed as $f=(lr\_x-ul\_x)/cell\_count\_x$, where $lr\_x$ is the x-axis coordinate of the lower right corner point in the window field range e of the query window, $ul\_x$ is the x-axis coordinate of the upper left corner point in the window field range e of the query window, $cell\_count\_x$ is the number of pixels on the x-axis of the query window.

In the second feasible method, the target pixel resolution f can be calculated according to the height of the y-axis of the query window and the number of pixels on the y-axis of the query window. A calculation process thereof is similar to the calculation process of the first feasible method, and is therefore not repeated. Alternatively, the target resolution of the x-axis and the target resolution of the y-axis of the query window may be calculated separately, and the larger one is taken as the final target resolution f.

In this embodiment, the corresponding window query input is executed to obtain the window field range e and the number of window pixels p. Through the window field range e and the number of window pixels p, the target pixel resolution f can be accurately and conveniently calculated, and the speed of calculation is improved.

From the above, through this embodiment, according to a raster data access request, a target pixel resolution of a query window is determined, and a sampling level is calculated according to the target pixel resolution and a pixel resolution of a raster object. According to the sampling level and a threshold, a determination is made as to whether a column-level index is needed to be accessed. When the sampling level is greater than the threshold, raster data corresponding to the query window is accessed according to the column-level index, which improves the access speed of multiple pieces of raster data in a column and realizes a quick access of a massive amount of raster data for raster objects at any scale. Moreover, the calculation of the target resolution is fast and accurate, which helps to improve the accuracy of the calculation of the sampling level.

The raster data access method of this embodiment can be executed by any appropriate electronic device with data processing capabilities, which includes, but is not limited to: a server, a mobile terminal (such as a tablet computer, a mobile phone, etc.), and a PC.

Figure 3:
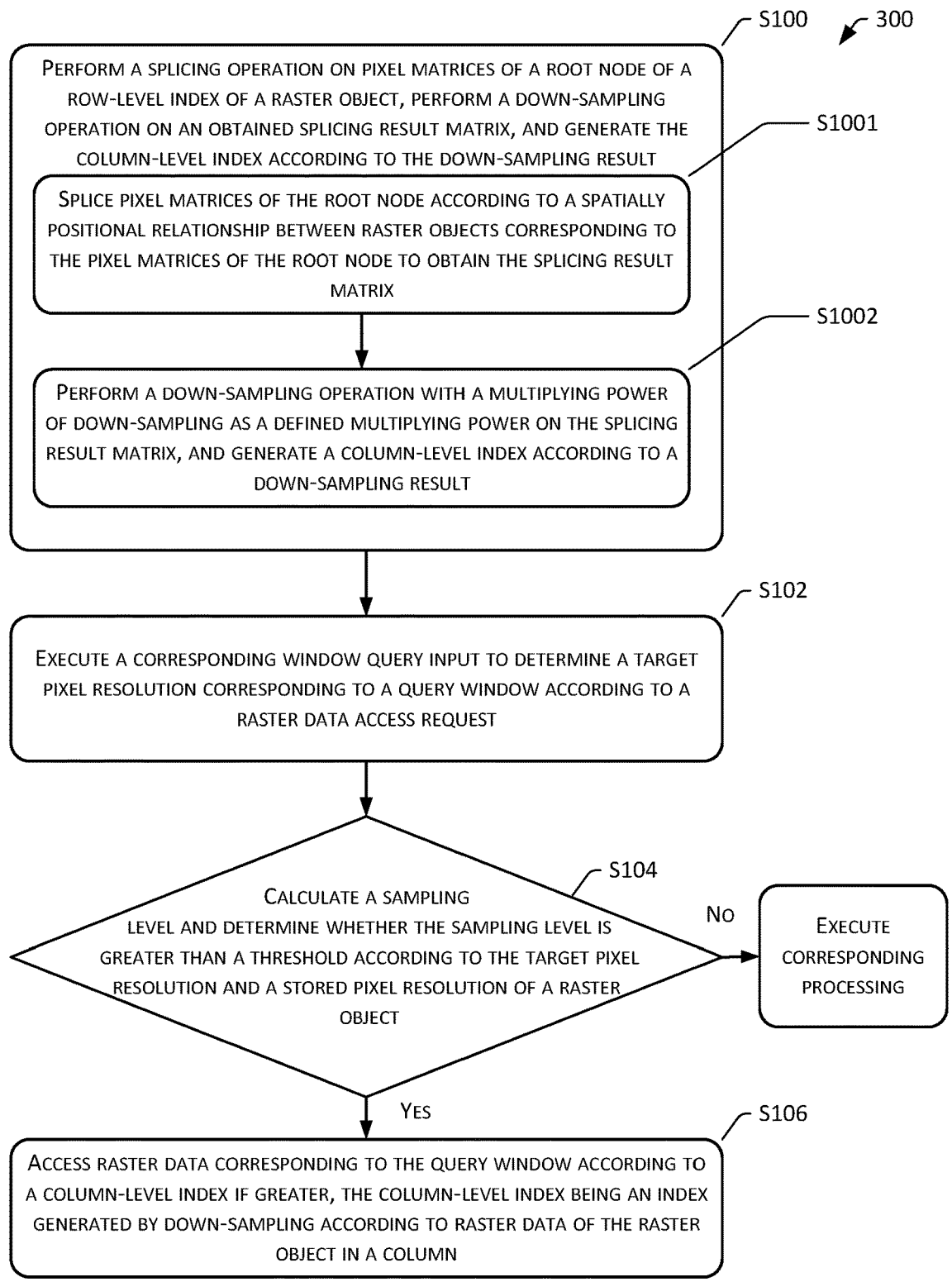
FIG. 3 is a flowchart of a method for accessing raster data according to the present disclosure.

Referring to FIG. 3, a flowchart of a raster data access method 300 according to the present disclosure is shown.

The raster data access method 300 includes the aforementioned steps S102 to S106.

Step S102 may be implemented using the method in the foregoing embodiments, or may be implemented in other methods.

In this embodiment, before step S102, the method further includes the following steps:

Step S100: Perform a splicing operation on pixel matrices of a root node of a row-level index of a raster object, perform a down-sampling operation on an obtained splicing result matrix, and generate the column-level index according to the down-sampling result.

In this embodiment, the row-level index is an index generated according to raster data of a certain raster object. One skilled in the art can generate a corresponding row-level index for each raster object in the spatial data table as needed, or only generate a corresponding row-level index for some raster objects in the spatial data table. By configuring a row-level index, the speed of accessing multi-resolution raster data of a raster object-level can be improved.

The row-level index may be any appropriate type of index. Different types of row-level index may be generated by one skilled in the art in an appropriate method. For example, the row-level index is a row-level quadtree block index with fixed-size blocks, with a structure thereof being shown in FIG. 4. A user creates a raster pyramid for raster objects in a spatial data table by executing a ST_BuildPyramid process function, and builds a corresponding row-level index based on the raster pyramid.

Figure 4:
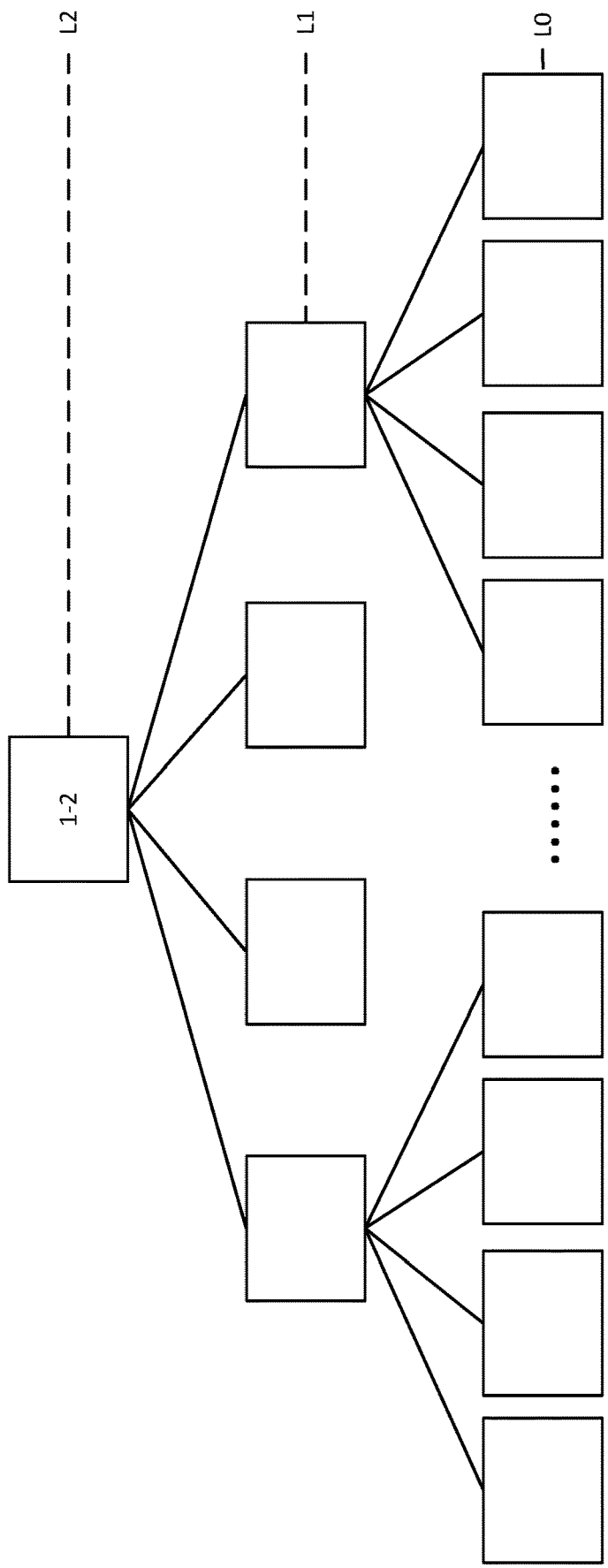
FIG. 4 is a schematic structural diagram of a row-level quadtree block index according to the present disclosure.

A specific process of constructing the row-level index is:

performing a segmentation operation on original raster data (i.e., a pixel matrix) to obtain fixed-size raster segments, and storing the raster segments as leaf nodes in the bottom layer of the row-level index (which is shown as L0 layer in FIG. 4).

Based on the leaf nodes, stepwise down-sampling with a multiplying power as F (F can be determined according to needs, which is an integer greater than 1, and F=2 in this example) is executed, and correspondingly a set of reduced-resolution block objects (L1 and L2 layers as described in FIG. 4) including N levels (N can be determined according to needs, and is an integer greater than or equal to 1, and in this example, N=2) is constructed. The block objects are used to store a pixel matrix of each node of the row-level index.

Optionally, in order to facilitate retrieval, the row-level index may be saved in an index table for storage. For ease of description, the index table is denoted as Table 1, which may be a row-level raster quadtree block index table.

The fields in Table 1 include, but are not limited to: a rid field, a level field, a row field, a column field, and a block field. A block field is used to store a block object of a raster block. A block object is composed of a pixel matrix. Generally, the sizes of pixel matrices in a same raster object are fixed, which can be 256 pixels×256 pixels, etc. A rid field is a unique identifier of a raster object to which a raster block belongs in the row-level index. A level field is a level of a raster block in the row-level index. A row field is a serial number in a row dimension where a raster block is located. A column field is a serial number in a column dimension where a raster block is located.

TABLE 1

| Rid | Level | Row | Column | Block |
|-----|-------|-----|--------|-------|
| 1   | 0     | 0   | 0      | [cell_matrix] |
| 1   | 0     | 1   | 1      | [cell_matrix] |
| ... | ...   | ... | ...    | ... |

In Table 1, each tuple stores block information of a raster block, and the block information includes a block object and a block index number, wherein the rid field, the level field, the row field and the column field constitute the block index number of the raster block. The second row in Table 1 is used as an example, where a block index number of a raster block is 1000, a raster object to which the raster block belongs is a raster object identified as 1 in the spatial data table. The raster block is in a row level of L0 in the level index, a serial number in a row dimension and a serial number in a column dimension in a pixel matrix of a raster object of the raster block are 0 and 0 respectively. The block object of the raster block is a pixel matrix stored in the block field.

In order to further speed up the retrieval of raster blocks, a B–tree or B+tree index can be further constructed based on block index numbers.

In this embodiment, based on the row-level index as described above, a user can execute a preset statement to instruct to create a column-level index, so that raster data in a column can be accessed faster. Moreover, since the column-level index is created based on the row-level index, the row-level index and the column-level index of the raster object can be comprehensively used to speed up the efficiency of accessing raster data at multi-resolution and arbitrary scale.

In a specific implementation, step S100 includes the following sub-steps:

Sub-step S1001: Splice pixel matrices of the root node according to a spatially positional relationship between raster objects corresponding to the pixel matrices of the root node to obtain the splicing result matrix.

Figure 5:
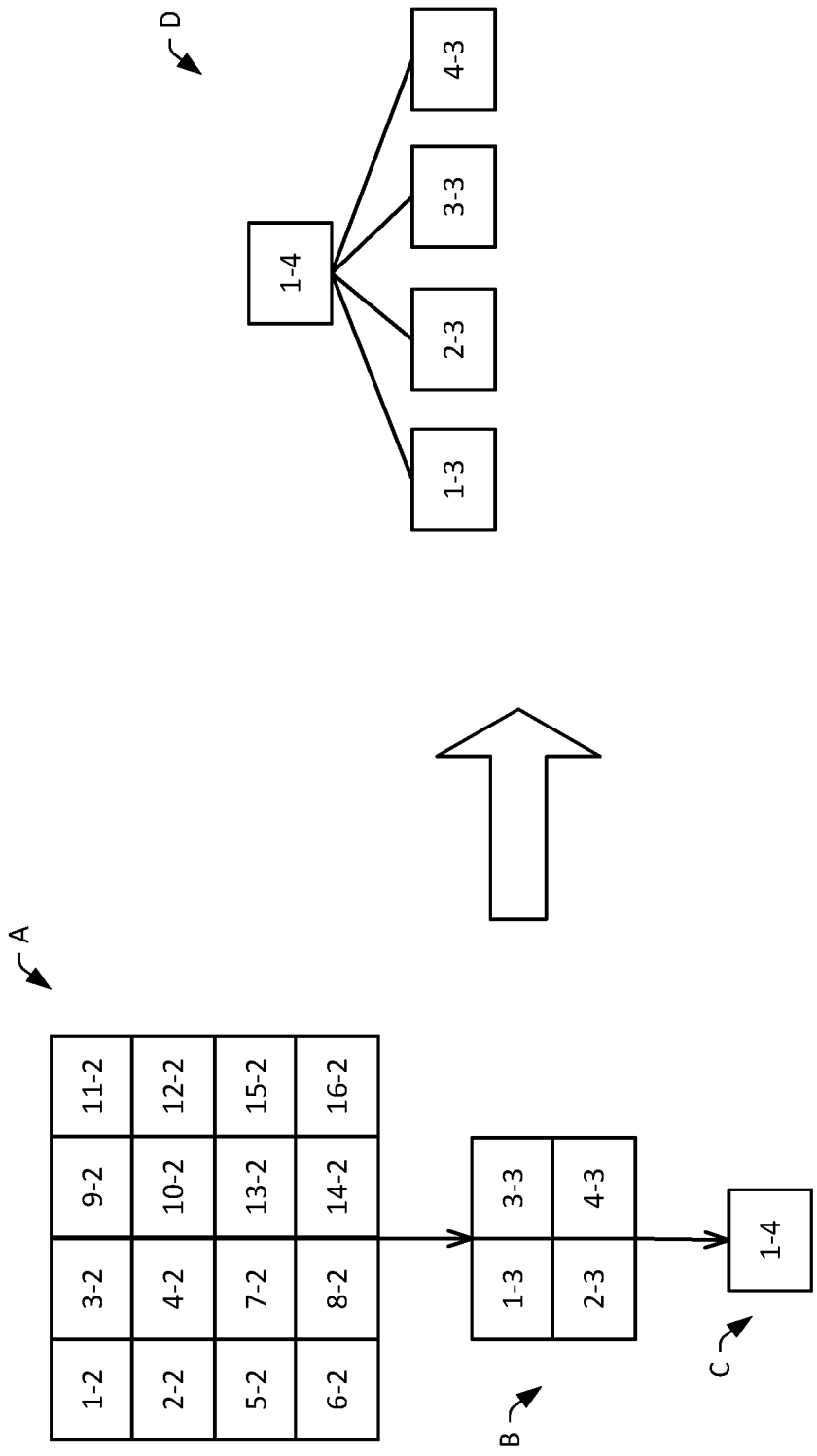
FIG. 5 is a schematic flowchart of generating a column-level index by down-sampling according to a splicing result matrix.

In this embodiment, since raster data in a raster object is used to indicate geographic spatial data, when splicing the pixel matrices of the root node, a positional relationship between the pixel matrices of the root node is determined according to a spatially positional relationship between corresponding raster objects to ensure that a splicing result matrix is consistent with an actual geographic space. A structure of a splicing result matrix is shown at A in FIG. 5, where 1-2 to 16-2 indicate pixel matrices of a root node of a row-level index of raster objects 1-16.

Sub-step 1002: Perform a down-sampling operation with a multiplying power of down-sampling as a defined multiplying power on the splicing result matrix, and generate a column-level index according to a down-sampling result.

The defined multiplying power (denoted as G, and in this example G=2). Apparently, one skilled in the art can set the defined multiplying power G to other values, such as 4, 6, etc. according to requirements of the accuracy of retrieval and the number of levels of the column-level index.

When performing the down-sampling operation, one or more down-sampling operations can be performed according to different sizes of the splicing result matrixes until a down-sampling result meets a termination condition. For example, the termination condition may be the number of raster blocks obtained by the down-sampling operation to be 1.

When multiple down-sampling operations are performed, the first down-sampling operation is performed based on the splicing result matrix, and a subsequent down-sampling operation is performed based on a previous down-sampling result. Down-sampling results of performing two down-sampling operations are shown at B and C in FIG. 5, where 1-3 to 4-3 at B indicate pixel matrices after down-sampling based on the splicing result matrix, and 1-4 at C indicates a pixel matrix after down-sampling based on the down-sampling result at B.

When a column-level index is generated, a column-level index with a height of M levels is constructed according to down-sampling results of each down-sampling operation. The column-level index constructed in this embodiment is shown as D in FIG. 5. M is an integer greater than or equal to 1, and the value of M is equal to the number of down-sampling operations.

In this embodiment, the column-level index is a column-level quadtree block index. The column-level index can be stored in a column-level raster quadtree block index table. One skilled in the art can configure the fields of the column-level raster quadtree block index table as needed, which is not limited in this embodiment.

In other embodiments, the column-level index may be another type of index, which is not limited in this embodiment.

Through this embodiment, according to a raster data access request, a target pixel resolution of a query window is determined, and a sampling level is calculated according to the target pixel resolution and a pixel resolution of a raster object. Based on a size relationship between the sampling level and the threshold, a determination of whether a column-level index is needed to be accessed is made. When the sampling level is greater than the threshold, raster data corresponding to the query window is accessed according to the column-level index, which improves the speed of accessing multiple pieces of raster data in a column and realizes a fast access to a massive amount of raster data of raster objects at any scale. Furthermore, an amount of column-level index data is relatively small, without leading to a large amount of data redundancy.

In addition, on the one hand, by importing a piece of geospatial image data into a row of a raster column of a spatial data table and storing it as a raster object, users can conveniently map an external piece of geospatial image data to a raster object in the spatial data table, a conceptual correspondence relationship is relatively clear, and a size of a single raster object is not limited. Constructing an in-row index for each raster object can speed up multi-resolution raster data access within a row.

On the other hand, due to a creation of a column-level index, the needs of users for seamless and integrated queries of large-scale geospatial image data is met, the problem of "pixel resolution overload", the problem of reading a large number of small objects, and the problem of a large degradation in the access performance of a spatial database system during real-time sampling can be solved effectively.

The so-called pixel resolution overload, i.e., when a user performs a window-based query on a spatial data table in an entire spatial database system (i.e., displaying all raster objects that intersect a query window), more and more raster objects are accessed as the coverage of the query window increases, and it may occur that a pixel resolution required by the query window exceeds a geographic range covered by a raster object itself (i.e., the range covered by the raster object that is displayed on a screen map Is less than one screen pixel).

This raster data access method not only has an advantage of storing and managing raster data in units of raster objects, but also speeding up the efficiency of accessing raster data by directly accessing a column-level index when an access to raster data of multiple raster objects is needed through the column-level index. The column-level index is created directly based on a pixel matrix of a root node of a row-level index through down-sampling operation(s), so a data volume of the column-level index itself is largely controlled. The speed of creation will be very fast, and the resource overhead is fully controllable, having a good practicality.

The raster data access method of this embodiment can be executed by any appropriate electronic device with data processing capabilities, which includes, but is not limited to: a server, a mobile terminal (such as a tablet computer, a mobile phone, etc.), and a PC, etc.

Figure 6:
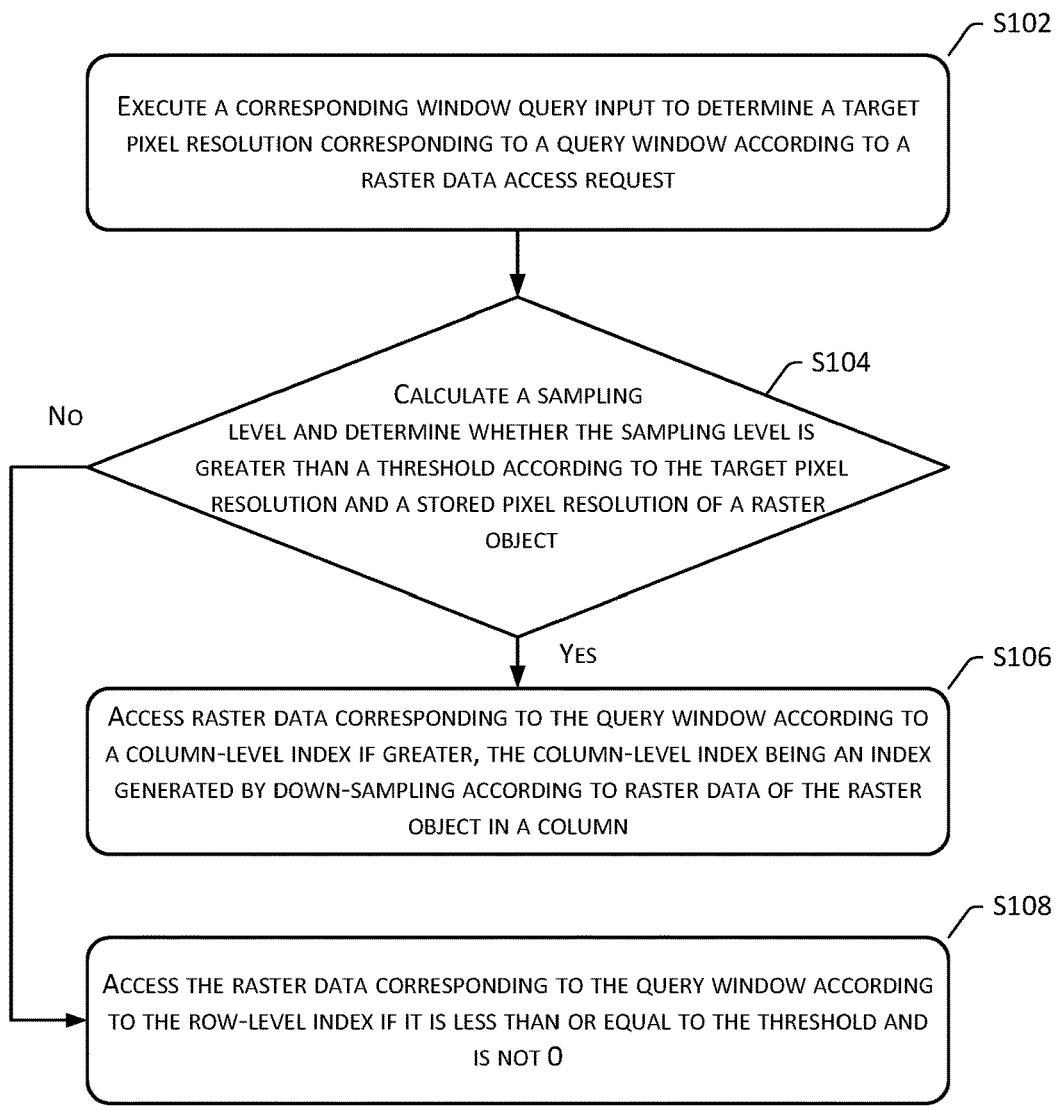
FIG. 6 is a flowchart of a method for accessing raster data according to the present disclosure.

Referring to FIG. 6, a flowchart of a raster data access method 600 according to the present disclosure is shown.

The raster data access method 600 includes aforementioned steps S102 to S106.

Step S102 can be implemented in the manner in the foregoing embodiments, or in other manners.

In this embodiment, when the threshold is the number of levels of a row-level index that is generated according to raster data of a raster object in a row, the method further includes step S108.

Step S108: Access the raster data corresponding to the query window according to the row-level index if it is less than or equal to the threshold and is not 0.

When the raster object in the spatial data table has a corresponding row-level index, and the threshold is the number of levels of the row-level index generated according to the raster data of the raster object in the row, step S106 is executed if the sampling level determined in step S104 is greater than the threshold. If the sampling level is determined to be less than or equal to the threshold and not equal to 0, step S108 is executed. If the sampling level is equal to 0, the original pixel matrix can be directly accessed.

A process of performing step S106 may be the same as the process of performing step S106 in the foregoing embodiments, and so will not be repeatedly described.

When step S108 is performed, since the sampling level lv is less than or equal to the number of levels of the row-level index and is not 0, this indicates that raster data in a raster object is needed, so the row-level index is accessed to ensure a good access rate of raster object-level multi-resolution raster data.

According to a raster data access request, a target pixel resolution of a query window is determined, a sampling level according to a target pixel resolution and a pixel resolution of a raster object are calculated. A determination of whether accessing a column-level index is needed is made based on a size relationship between the sampling level and the threshold. When the sampling level is greater than the threshold, raster data corresponding to the query window is accessed according to the column-level index, which improves the speed of accessing multiple pieces of raster data in a column, and realizes a fast access of a massive amount of raster data of raster objects at any scale. An amount of column-level index data is relatively small, which will not lead to a large amount of data redundancy. Using a joint index mechanism of a row-level index and a column-level index can improve the performance of query accesses.

Figure 7:
FIG. 7 is a structural block diagram of an apparatus for accessing raster data according to the present disclosure.

Referring to FIG. 7, a structural block diagram of a raster data access apparatus 700 according to the present disclosure is shown.

The raster data access apparatus 700 includes a determination module 702, a judgment module 704, and a first access module 706.

The determination module 702 is configured to execute a corresponding window query input to determine a target pixel resolution corresponding to a query window according to a raster data access request.

In this embodiment, the raster data access apparatus is used to access raster data in a spatial database system. In other embodiments, the apparatus can be used to access raster data in other database systems, for example, to access raster data in a database system that stores raster data of paintings.

The spatial database system uses raster data to store geospatial data. For example, a spatial data table is stored in a spatial database system, and a field type of a certain column in the spatial data table is a raster data type, which is used to store data corresponding to a raster object. One skilled in the art can select an appropriate storage method for raster objects as needed.

For example, a storage method is: using each row in a raster column whose data type is a raster data type to store a raster object (such as a remote sensing image). If necessary, metadata of the raster object and an index is stored in a row, and raster data (i.e., a pixel matrix) corresponding to the raster object can be directly stored in an original raster file, which can reduce data redundancy.

For another example, another storage method is: storing metadata of a raster object in a row of a spatial data table, generating an in-row index according to a pixel matrix of the raster object, and storing the pixel matrix in an in-row index table in a form of a raster block based on the in-row index.

In this embodiment, when a user performs a window query access to a spatial data table, a raster data access request is triggered to request access to raster data of a raster object in a query window. Apparently, a database system can be configured with different service logics according to different service requirements. A raster data access request can be triggered in any appropriate method, which is not limited in this embodiment.

According to the raster data access request, a corresponding window query input can be executed to determine a target pixel resolution corresponding to the query window. In different services, the meaning indicated by the target pixel resolution may be different. For example, in a spatial data table, the target pixel resolution is used to indicate an actual geographic area corresponding to each pixel in the query window.

For one skilled in the art, the target pixel resolution can be determined according to the executed window query input in an appropriate method as needed, which is not limited in this embodiment.

The judgment module 704 is configured to calculate a sampling level and determine whether the sampling level is greater than a threshold according to the target pixel resolution and a stored pixel resolution of a raster object.

The stored pixel resolution of the raster object is used to indicate an actual geographic area corresponding to a pixel in the raster object. For example, if the pixel resolution of the raster object is 1 meter, this means that the pixel indicates a surface feature with a range of 1 square meter.

According to the target pixel resolution (denoted as f) and the pixel resolution of the raster object (denoted as g), a sampling level (denoted as lv) can be calculated. In this embodiment, the sampling level lv is used to indicate a proportional relationship between the target pixel resolution f and the pixel resolution g of the raster object. The sampling level lv can be calculated in any suitable way.

For example, a ratio of the target pixel resolution f to the pixel resolution g of the raster object is calculated, and a logarithmic value of the ratio to a base 2 is obtained. The logarithmic value is rounded as the sampling level lv. In this manner, the sampling level lv can be expressed as: lv=log2 (f_x/g_x), where f_x is a target pixel resolution of the x-axis of the query window, and g_x is a pixel resolution of the x-axis of the raster object. Alternatively, the sampling level lv may also be calculated based on a target pixel resolution of the y-axis of the query window and a pixel resolution of the y-axis of the raster object.

Apparently, in other embodiments, for different service requirements, the sampling level lv may indicate other meanings, and one skilled in the art may use other appropriate methods to calculate the sampling level lv.

According to the calculated sampling level lv, a determination can be made as to whether it is necessary to access raster data of more than one raster object by determining whether the sampling level is greater than a threshold. If the sampling level lv is greater than the threshold, the first access module 706 executes a corresponding operation. If the sampling level lv is not greater than the threshold, this means that only raster data access at a raster object level is needed. In this case, existing methods can be used to access the raster data, such as a direct access to raster data stored in a row of the raster object.

It should be noted that, depending on a configuration of the spatial data table, the threshold may be any appropriate value. For example, if a row-level index is generated in the spatial data table based on raster data of raster objects in rows, the threshold can be configured as a level of the row-level index (such level is a level of the row-level index). For example, a root node of the row-level index is level 1, and a leaf node is level 1, and the level is 3 if there is a layer of intermediate nodes between the root node and the leaf node). Alternatively, if the raster data of the raster object is stored in a form of an original raster file, and the row-level index is not set in the spatial data table, one skilled in the art can configure the threshold to any appropriate set threshold as needed. For example, the threshold can be set to 0.

The first access module 706 is configured to access raster data corresponding to the query window according to a column-level index if greater, the column-level index being an index generated by down-sampling according to raster data of the raster object in a column.

The column-level index is an index generated according to the raster data of the raster object in the column. One skilled in the art can use an appropriate method to generate the column-level index as needed. By configuring the column-level index, raster data corresponding to a query window can be accessed according to the column-level index when a large-scale window query (i.e., a sampling level lv is greater than the threshold) is needed, to increase the access speed when multi-resolution accesses are executed for multi raster objects, reduce performance degradation, and improve the performance of query accesses.

In this embodiment, the column-level index is generated by down-sampling according to raster data of the raster objects in the column. Down-sampling refers to an operation of sampling a pixel matrix with a larger dimension to obtain a pixel matrix with a smaller dimension. For example, a pixel matrix of 256 pixels*256 pixels is obtained from a pixel matrix of 512 pixels*512 pixels through a sampling algorithm. Since the column-level index is generated by down-sampling, a data volume of the column-level index itself can be controlled to be relatively small, and the speed of creating the column-level index can be made faster, so that the resource overhead can be controlled.

In implementations, the apparatus 700 may further include one or more processors 708, an input/output (I/O) interface 710, a network interface 712, and memory 714.

The memory 714 may include a form of computer readable media such as a volatile memory, a random access memory (RAM) and/or a non-volatile memory, for example, a read-only memory (ROM) or a flash RAM. The memory 714 is an example of a computer readable media. In implementations, the memory 714 may include program modules 716 and program data 718. The program modules 716 may include one or more of the modules as described above and shown in FIG. 7.

In implementations, the computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

Through this embodiment, according to a raster data access request, a target pixel resolution of a query window is determined, and a sampling level is calculated according to the target pixel resolution and a pixel resolution of a raster object. A determination is made about whether a column-level index is needed to be accessed based on a relationship between the sampling level and a threshold. When the sampling level is greater than the threshold, raster data corresponding to the query window is accessed according to the column-level index, which improves the access speed of multiple pieces of raster data in a column and realizes quick access of massive raster data at any scale.

Figure 8:
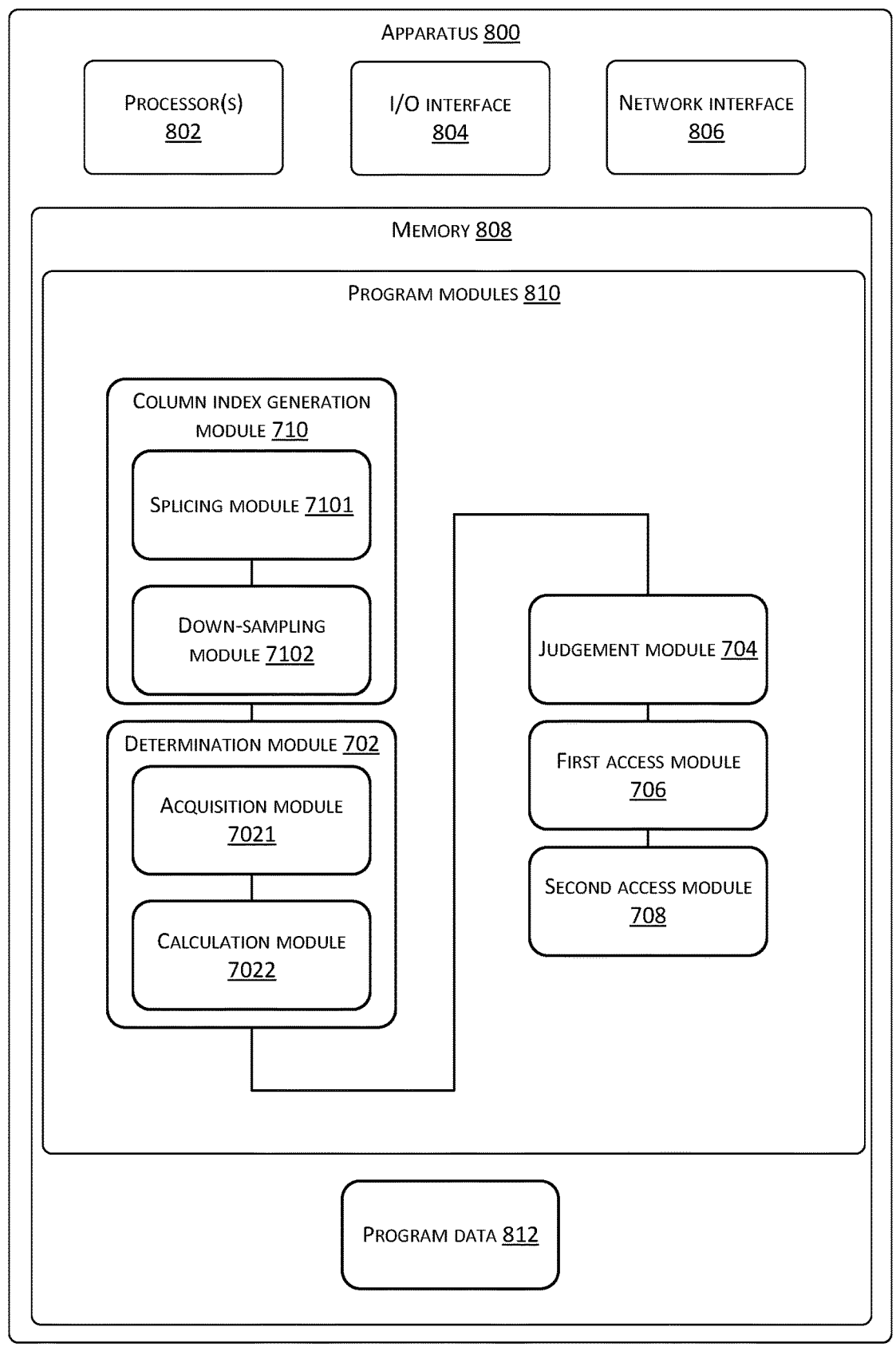
FIG. 8 is a structural block diagram of an apparatus for accessing raster data according to the present disclosure.

Referring to FIG. 8, a structural block diagram of a raster data access apparatus 800 according to the present disclosure is shown.

The raster data access apparatus 800 includes the determination module 702, the judgment module 704, and the first access module 706 as described above.

Optionally, the determination module 702 includes an acquisition module 7021 and a calculation module 7022.

The acquisition module 7021 is configured to perform the corresponding window query input to obtain a corresponding window field range and a number of window pixels according to the raster data access request.

In this embodiment, when a raster data access request is triggered, a corresponding window query input is executed to obtain a window field range (denoted as e) and a number of window pixels (denoted as p) of a query window.

The window field range e is used to indicate an area of an actual geographic space corresponding to the query window. In this embodiment, coordinates of the upper left corner and the lower right corner of the query window are used to represent the window field range e of the query window, which is denoted as e=(ul_x, ul_y), (lr_x, lr_y). In other embodiments, other ways may be used to represent the window field range e of the query window.

The number of window pixels p is used to indicate the number of pixels corresponding to the query window on a display device. In this embodiment, the number of pixels p in the query window is represented by the number of pixels in the x-axis direction and the number of pixels in the y-axis direction, which is denoted as p=(cell_count_x, cell_count_y). In other embodiments, the number p of window pixels of the query window may be expressed in other ways.

Apparently, in other embodiments, according to different service requirements, executing the corresponding window query input can obtain other information that can characterize the query window, which is not limited in this embodiment.

The calculation module 7022 is configured to calculate the target pixel resolution corresponding to the query window according to the window field range and the number of pixels in the query window.

In a first feasible method, a process of calculating the target pixel resolution f corresponding to the query window is: calculating the x-axis length of the query window according to the window field range e, determining the number of pixels on the x-axis of the query window according to the number of window pixels p, calculating a ratio of the length of the x-axis of the query window to the number of pixels on the x-axis of the query window, and determining the ratio as the target pixel resolution f.

In this method, the target pixel resolution f can be expressed as f=(lr_x−ul_x)/cell_count_x, where lr_x is the x-axis coordinate of the lower right corner point in the window field range e of the query window, ul_x is the x-axis coordinate of the upper left corner point in the window field range e of the query window, cell_count_x is the number of pixels on the x-axis of the query window.

In the second feasible method, the target pixel resolution f can be calculated according to the height of the y-axis of the query window and the number of pixels on the y-axis of the query window. A calculation process thereof is similar to the calculation process of the first feasible method, and is therefore not repeated. Alternatively, the target resolution of the x-axis and the target resolution of the y-axis of the query window may be calculated separately, and the larger one is taken as the final target resolution f.

In this embodiment, the corresponding window query input is executed to obtain the window field range e and the number of window pixels p. Through the window field range e and the number of window pixels p, the target pixel resolution f can be accurately and conveniently calculated, and the speed of calculation is improved.

Optionally, when the threshold is the number of levels of the row-level index generated according to the raster data of the raster object in the row, the apparatus further includes a second access module 708. The second access module 708 is configured to access the raster data corresponding to the query window according to the row-level index if it is less than or equal to the threshold and not 0.

When the raster object in the spatial data table has a corresponding row-level index, and the threshold is the number of levels of the row-level index generated according to the raster data of the raster object in the row, the first access module 706 performs an operation if the judgment module 704 judges that the sampling level is greater than the threshold. If it is determined that the sampling level is less than or equal to the threshold and not equal to 0, the second access module 708 performs an operation. If the sampling level is equal to 0, an original pixel matrix can be directly accessed.

During the operation of the second access module 708, since the sampling level lv is less than or equal to the number of levels of the row-level index and is not 0, this indicates that raster data in a raster object is required, and so the row-level index is accessed to ensure a good access rate of raster object-level multi-resolution raster data.

Optionally, the apparatus further includes a column index generation module 710, which is configured to perform a splicing operation on a pixel matrix of a root node of a row-level index of the raster object, perform down-sampling operation(s) on an obtained splicing result matrix, and generate the column-level index according to a down-sampling result, before executing the corresponding window query input to determine the target pixel resolution corresponding to the query window according to the raster data access request.

In this embodiment, the row-level index is an index generated according to raster data of a certain raster object. One skilled in the art can generate a corresponding row-level index for each raster object in the spatial data table as needed, or only generate a corresponding row-level index for some raster objects in the spatial data table. By configuring a row-level index, the speed of accessing multi-resolution raster data of a raster object-level can be improved.

The row-level index may be any appropriate type of index. Different types of row-level index may be generated by one skilled in the art in an appropriate method. For example, the row-level index is a row-level quadtree block index with fixed-size blocks, with a structure thereof being shown in FIG. 4. A user creates a raster pyramid for raster objects in a spatial data table by executing a ST_BuildPyramid process function, and builds a corresponding row-level index based on the raster pyramid.

A specific process of constructing the row-level index is:
performing a segmentation operation on original raster data (i.e., a pixel matrix) to obtain fixed-size raster segments, and storing the raster segments as leaf nodes in the bottom layer of the row-level index (which is shown as L0 layer in FIG. 4).

Based on the leaf nodes, stepwise down-sampling with a multiplying power as F (F can be determined according to needs, which is an integer greater than 1, and F=2 in this example) is executed, and correspondingly a set of reduced-resolution block objects (L1 and L2 layers as described in FIG. 4) including N levels (N can be determined according to needs, and is an integer greater than or equal to 1, and in this example, N=2) is constructed. The block objects are used to store a pixel matrix of each node of the row-level index.

Optionally, in order to facilitate retrieval, the row-level index may be saved in an index table for storage. The following Table 1 shows a row-level raster quadtree block index table. The fields in Table 1 include, but are not limited to: a rid field, a level field, a row field, a column field, and a block field.

TABLE 1

| Rid | Level | Row | Column | Block |
|---|---|---|---|---|
| 1 | 0 | 0 | 0 | [cell_matrix] |
| 1 | 0 | 1 | 1 | [cell_matrix] |
| ... | ... | ... | ... | ... |

In Table 1, each tuple stores block information of a raster block, and the block information includes a block object and a block index number.

The rid field, the level field, the row field and the column field constitute the block index number of the raster block. A block object is composed of a pixel matrix. Generally, the sizes of pixel matrices in a same raster object are fixed, which can be 256 pixels×256 pixels, etc. A rid field is a unique identifier of a raster object to which a raster block belongs in the row-level index. A level field is a level of a raster block in the row-level index. A row field is a serial number in a row dimension where a raster block is located. A column field is a serial number in a column dimension where a raster block is located.

In order to further speed up the retrieval of raster blocks, a B−tree or B+tree index can be further constructed based on block index numbers.

In this embodiment, based on the row-level index as described above, a user can execute a preset statement to instruct to create a column-level index, so that raster data in a column can be accessed faster. Moreover, since the column-level index is created based on the row-level index, the row-level index and the column-level index of the raster object can be comprehensively used to speed up the efficiency of accessing raster data at multi-resolution and arbitrary scale.

Optionally, the column index generation module 710 includes a splicing module 7101 and a down-sampling module 7102.

The splicing module 7101 is configured to splice pixel matrices of the root node according to a spatially positional relationship between raster objects corresponding to the pixel matrices of the root node to obtain the splicing result matrix.

In this embodiment, since raster data in a raster object is used to indicate geographic spatial data, when splicing the pixel matrices of the root node, a positional relationship between the pixel matrices of the root node is determined according to a spatially positional relationship between corresponding raster objects to ensure that a splicing result matrix is consistent with an actual geographic space. A structure of a splicing result matrix is shown at A in FIG. 5.

The down-sampling module 7102 is configured to perform a down-sampling operation with a multiplying power of down-sampling as a defined multiplying power on the splicing result matrix, and generate a column-level index according to a down-sampling result.

The defined multiplying power (denoted as G, and in this example G=2). Apparently, one skilled in the art can set the defined multiplying power G to other values, such as 4, 6, etc. according to requirements of the accuracy of retrieval and the number of levels of the column-level index.

When performing the down-sampling operation, one or more down-sampling operations can be performed according to different sizes of the splicing result matrixes until a down-sampling result meets a termination condition. For example, the termination condition may be the number of raster blocks obtained by the down-sampling operation to be 1.

When multiple down-sampling operations are performed, the first down-sampling operation is performed based on the splicing result matrix, and a subsequent down-sampling operation is performed based on a previous down-sampling result. Down-sampling results of performing two down-sampling operations are shown at B and C in FIG. 5.

When a column-level index is generated, a column-level index with a height of M levels is constructed according to down-sampling results of each down-sampling operation. The column-level index constructed in this embodiment is shown as D in FIG. 5. M is an integer greater than or equal to 1, and the value of M is equal to the number of down-sampling operations.

In this embodiment, the column-level index is a column-level quadtree block index. The column-level index can be stored in a column-level raster quadtree block index table. One skilled in the art can configure the fields of the column-level raster quadtree block index table as needed, which is not limited in this embodiment.

In other embodiments, the column-level index may be another type of index, which is not limited in this embodiment.

Through this embodiment, according to a raster data access request, a target pixel resolution of a query window is determined, and a sampling level is calculated according to the target pixel resolution and a pixel resolution of a raster object. Based on a size relationship between the sampling level and the threshold, a determination of whether a column-level index is needed to be accessed is made. When the sampling level is greater than the threshold, raster data corresponding to the query window is accessed according to the column-level index, which improves the speed of accessing multiple pieces of raster data in a column and realizes a fast access to a massive amount of raster data of raster objects at any scale. Furthermore, an amount of column-level index data is relatively small, without leading to a large amount of data redundancy.

In addition, on the one hand, by importing a piece of geospatial image data into a row of a raster column of a spatial data table and storing it as a raster object, users can conveniently map an external piece of geospatial image data to a raster object in the spatial data table, a conceptual correspondence relationship is relatively clear, and a size of a single raster object is not limited. Constructing an in-row index for each raster object can speed up multi-resolution raster data access within a row.

On the other hand, due to a creation of a column-level index, the needs of users for seamless and integrated queries of large-scale geospatial image data is met, the problem of "pixel resolution overload", the problem of reading a large number of small objects, and the problem of a large degradation in the access performance of a spatial database system during real-time sampling can be solved effectively.

The so-called pixel resolution overload, i.e., when a user performs a window-based query on a spatial data table in an entire spatial database system (i.e., displaying all raster objects that intersect a query window), more and more raster objects are accessed as the coverage of the query window increases, and it may occur that a pixel resolution required by the query window exceeds a geographic range covered by a raster object itself (i.e., the range covered by the raster object that is displayed on a screen map is less than one screen pixel).

In implementations, the apparatus 800 may further include one or more processors 802, an input/output (I/O) interface 804, a network interface 806, and memory 808.

The memory 808 may include a form of computer readable media as described in the foregoing description. In implementations, the memory 808 may include program modules 810 and program data 812. The program modules 814 may include one or more of the modules as described above and shown in FIG. 8.

This raster data access apparatus not only has an advantage of storing and managing raster data in units of raster objects, but also speeding up the efficiency of accessing raster data by directly accessing a column-level index when an access to raster data of multiple raster objects is needed through the column-level index. The column-level index is created directly based on a pixel matrix of a root node of a row-level index through down-sampling operation(s), so a data volume of the column-level index itself is largely controlled. The speed of creation will be very fast, and the resource overhead is fully controllable, having a good practicality.

Figure 9:
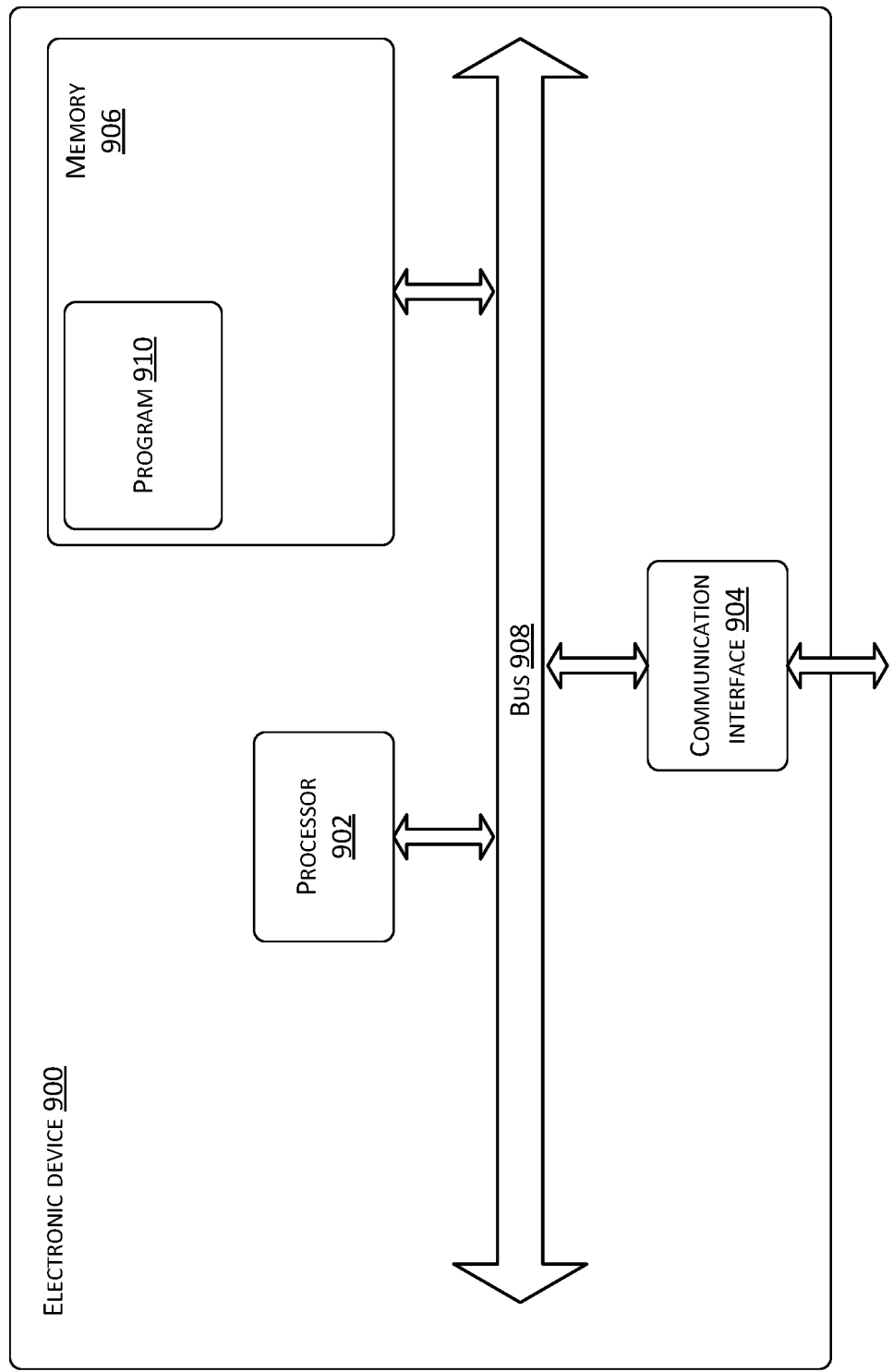
FIG. 9 is a schematic structural diagram of an electronic device according to the present disclosure.

Referring to FIG. 9, a schematic structural diagram of an electronic device 900 according to the present disclosure is shown. The specific embodiment of the present disclosure does not limit specific implementations of the electronic device 900.

As shown in FIG. 9, the electronic device 900 may include: a processor 902, a communication interface 904, a memory 906, and a communication bus 908.

The processor 902, the communication interface 904, and the memory 906 communicate with each other through the communication bus 908.

The communication interface 904 is used to communicate with other electronic devices such as terminal devices or servers.

The processor 902 is configured to execute a program 910, and specifically can execute relevant steps in the embodiments of the raster data access methods as described above.

Specifically, the program 910 may include program codes, and the program codes include computer executable instructions.

The processor 902 may be a central processing unit (CPU), an Application Specific Integrated Circuit (ASIC), or one or more integrated circuits configured to implement the embodiments of the present disclosure. One or more processors included in the electronic device may be processors of a same type, such as one or more CPUs; or processors of different types, such as one or more CPUs and one or more ASICs.

The memory 906 is used to store the program 910. The memory 906 may include a high-speed RAM memory, or may also include a non-volatile memory, for example, at least one magnetic storage device.

The program 910 is configured to cause the processor 902 to execute a corresponding window query input to determine a target pixel resolution corresponding to a query window according to a raster data access request; calculate a sampling level and determining whether the sampling level is greater than a threshold according to the target pixel resolution and pixel resolution(s) of stored raster object(s); and access raster data corresponding to the query window according to a column-level index if greater, the column-level index being an index generated by down-sampling according to raster data of the raster object(s) in columns.

In implementations, the program 910 is further configured to cause the processor 902 to execute the corresponding window query input according to the raster data access request to obtain a corresponding window field range and a number of window pixels when executing the corresponding window query input according to the raster data access request to determine the target pixel resolution corresponding to the query window; and calculate the target pixel resolution corresponding to the query window according to the window field range and the number of pixels in the query window.

In implementations, the threshold is a defined threshold, or the threshold is the number of levels of a row-level index generated according to raster data of raster objects in a row.

In implementations, the program 910 is further configured to cause the processor 902 to assess the raster data corresponding to the query window according to the row-level index if being less than or equal to the threshold and not 0, when the threshold is the number of levels of the row-level index generated according to the raster data of the raster objects in the row.

In implementations, the program 910 is further configured to cause the processor 902 to perform a splicing operation on pixel matrices of a root node of the row-level index of the raster object and perform a down-sampling operation on an obtained splicing result matrix, and generate the column-level index according to a down-sampling result, before executing the corresponding window query input according to the raster data access request to determine the target pixel resolution corresponding to the query window.

In implementations, the program 910 is further configured to cause the processor 902 to splice the pixel matrices of the root node according to a spatial positional relationship between raster objects corresponding to the pixel matrices of the root node to obtain the splicing result matrix when performing the splicing operation on the pixel matrices of the root node of the row-level index of the raster object and perform the down-sampling operation on the obtained splicing result matrix, and generating the column-level index according to the down-sampling result; As a result matrix, and perform a down-sampling operation with a down-sampling multiplying power as a defined multiplying power, and generate the column-level index according to the down-sampling result.

Details of implementations of the steps in the program 910 can be referenced to corresponding descriptions in corresponding steps and units in the embodiment of the raster data access methods described above, which are not repeated herein. One skilled in the art can clearly understand that, for the convenience and simplicity of description, details of working processes of the devices and modules described above can be referenced to descriptions of corresponding processes in the foregoing method embodiments, which will not be repeated herein.

Through the electronic device of this embodiment, according to a raster data access request, a target pixel resolution of a query window is determined, and a sampling level is calculated according to the target pixel resolution and a pixel resolution of a raster object. A determination is made about whether a column-level index is needed to be accessed based on a relationship between the sampling level and a threshold. When the sampling level is greater than the threshold, raster data corresponding to the query window is accessed according to the column-level index, which improves the access speed of multiple pieces of raster data in a column and realizes quick access of massive raster data at any scale.

In this embodiment, a computer storage medium is provided, on which a spatial database is stored. The spatial database includes a spatial data table and a column-level index. At least one field of the spatial data table is used to store raster data of a raster object. For raster data, the column-level index is an index generated by down-sampling according to the raster data in the at least one field.

The spatial data table is, for example, the spatial data table described in the foregoing embodiments. A field type of a certain column in the spatial data table is a raster data type, which is used to store data corresponding to a raster object. One skilled in the art can select an appropriate storage method for raster objects as needed.

One storage method is to store metadata of raster objects in rows of a spatial data table, and generate an in-row index according to pixel matrices of the raster objects, and store the pixel matrices in a form of raster blocks based on an in-row index table of the in-row index.

The column-level index can be an index table independent of the spatial data table. The column-level index may be generated by down-sampling according to raster data in at least one field in the spatial data table as described in the foregoing embodiments.

Since the spatial database contains column-level indexes, when accessing raster data stored in the spatial data table, if a sampling level is greater than a threshold, i.e., a pixel overload occurs, a quick access to raster data corresponding to a query window can be made through the column-level index to improve the access speed.

It needs to point out that, according to the needs of implementations, each component/step described in the embodiments of the present disclosure can be split into more components/steps, or two or more components/steps or partial operations of components/steps can be combined into new components/steps to achieve the purpose of the embodiments of the present disclosure.

The above methods according to the embodiments of the present disclosure can be implemented in hardware, firmware, or implemented as software or computer codes that can be stored in a recording medium (such as CD ROM, RAM, a floppy disk, a hard disk, or a magnetic/optical disk), or implemented as computer codes that are originally stored in a remote recording medium or a non-transitory machine-readable medium and are downloaded and stored into a local recording medium through a network, so that the methods described herein can be processed by such software that is stored in a recording medium using a general-purpose computer, a dedicated processor, or a programmable or dedicated hardware (such as ASIC or FPGA). It can be understood that a computer, a processor, a microprocessor controller, or programmable hardware includes storage components (for example, RAM, ROM, flash memory, etc.) that can store or receive software or computer codes. When the software or computer codes are accessed and executed by the computer, processor or hardware, the raster data access method(s) described herein is/are implemented. In addition, when a general-purpose computer accesses codes for implementing a raster data access method as shown herein, an execution of the codes converts the general-purpose computer into a dedicated computer for executing the raster data access method as shown herein.

One of ordinary skill in the art may realize that the units and method steps of the examples described in combination with the embodiments disclosed herein can be implemented by electronic hardware, or a combination of computer software and electronic hardware. Whether these functions are executed by hardware or software depends on a specific application and design constraint conditions of the technical solution. One skilled in the art can use different methods for each specific application to implement the described functions, but such implementations should not be considered as going beyond the scope of the embodiments of the present disclosure.

The above implementations are only used to illustrate the embodiments of the present disclosure, and are not intended to limit the embodiments of the present disclosure. One of ordinary skill in the relevant technical field can also make various changes and modifications without departing from the spirit and scope of the embodiments of the present disclosure. Therefore, all equivalent technical solutions also belong to the scope of the embodiments of the present disclosure, and the scope of patent protection of the embodiments of the present disclosure should be defined by the claims.

The present disclosure can be further understood using the following clauses.

Clause 1: A method for accessing raster data, comprising: executing a corresponding window query input to determine a target pixel resolution corresponding to a query window according to a raster data access request; calculating a sampling level according to the target pixel resolution and a stored pixel resolution of a raster object, and determining whether the sampling level is greater than a threshold; and accessing raster data corresponding to the query window according to a column-level index if the sampling level is greater than the threshold, the column-level index being an index generated by down-sampling according to raster data of the raster object in a column.

Clause 2: The method as recited in Clause 1, wherein executing the corresponding window query input to determine the target pixel resolution corresponding to the query window according to the raster data access request comprises: executing the corresponding window query input to obtain a corresponding window field range and a number of pixels of the window according to the raster data access request; and calculating the target pixel resolution corresponding to the query window based on the window field range and the number of pixels of the query window.

Clause 3: The method as recited in Clause 1, wherein the threshold is a defined threshold, or the threshold is a number of levels of a row-level index generated according to the raster data of the raster object in a row.

Clause 4: The method as recited in Clause 3, wherein when the threshold is the number of levels of the row-level index generated according to the raster data of the raster object in the row, the method further comprises: accessing the raster data corresponding to the query window according to the row-level index if the sampling level is less than or equal to the threshold and is not 0.

Clause 5: The method as recited in Clause 1, wherein before executing the corresponding window query input to determine the target pixel resolution corresponding to the query window according to the raster data access request, the method further comprises: performing a splicing operation on pixel matrices of a root node of a row-level index of the raster object, performing a down-sampling operation on an obtained splicing result matrix, and generating the column-level index according to a down-sampling result.

Clause 6: The method as recited in Clause 5, wherein performing the splicing operation on the pixel matrices of the root node of the row-level index of the raster object, performing the down-sampling operation on the obtained splicing result matrix, and generating the column-level index according to the down-sampling result comprise: splicing the pixel matrices of the root node according to a spatial positional relationship between raster objects corresponding to the pixel matrices of the root node to obtain the splicing result matrix; and performing a down-sampling operation with a down-sampling multiplying power of a defined multiplying power for the splicing result matrix, and generating the column-level index according to the down-sampling result.

Clause 7: A raster data access apparatus comprising: a determination module configured to execute a corresponding window query input to determine a target pixel resolution corresponding to a query window according to a raster data access request; a judging module configured to calculate a sampling level according to the target pixel resolution and a stored pixel resolution of a raster object, and determine whether the sampling level is greater than a threshold; and a first access module configured to access raster data corresponding to the query window according to a column-level index if the sampling level is greater than the threshold, the column-level index being an index generated by down-sampling according to raster data of the raster object in a column.

Clause 8: The apparatus as recited in Clause 7, wherein the determination module comprises: an acquisition module configured to execute the corresponding window query input according to the raster data access request to obtain a corresponding window field range and a number of pixels of the window; and a calculation module configured to calculate the target pixel resolution corresponding to the query window according to the window field range and the number of pixels of the query window.

Clause 9: The apparatus as recited in Clause 7, wherein the threshold is a defined threshold, or the threshold is a number of levels of a row-level index generated according to the raster data of the raster object in a row.

Clause 10: The apparatus as recited in Clause 9, wherein when the threshold is the number of levels of the row-level index generated according to the raster data of the raster object in the row, the apparatus further comprises: a second access module configured to access the raster data corresponding to the query window according to the row-level index if the sampling level is less than or equal to the threshold and is not 0.

Clause 11: The apparatus as recited in Clause 7, further comprising: a column index generation module configured to perform a splicing operation on pixel matrices of a root node of a row-level index of the raster object, perform a down-sampling operation on an obtained splicing result matrix, and generate the column-level index according to a down-sampling result, before executing the corresponding window query input to determine the target pixel resolution corresponding to the query window according to the raster data access request.

Clause 12: The apparatus as recited in Clause 11, wherein the column index generation module comprises: a splicing module configured to splice the pixel matrices of the root node according to a spatial positional relationship between raster objects corresponding to the pixel matrices of the root node to obtain the splicing result matrix; and a down-sampling module configured to perform a down-sampling operation with a down-sampling multiplying power of a defined multiplying power for the splicing result matrix, and generating the column-level index according to the down-sampling result.

Clause 13: An electronic device, comprising: a processor, a memory, a communication interface, and a communication bus, wherein the processor, the memory, and the communication interface communicate with each other through the communication bus; and the memory is configured to store at least one executable instruction, the executable instruction causing the processor to perform operations corresponding to the raster data access method as recited in any one of Clauses 1-6.

Clause 14: A computer storage medium, wherein a spatial database is stored thereon, the spatial database comprises a spatial data table and a column-level index, at least one field of the spatial data table being used to store raster data of a raster object, and the column-level index being an index generated by down-sampling according to the raster data in the at least one field.

Clause 15: A computer storage medium with a computer program stored thereon that, when executed by a processor, implements the raster data access method as recited in any one of Clauses 1-6.

What is claimed is:

1. A method implemented by a computing device, the method comprising:
    executing a corresponding window query input to determine a target pixel resolution corresponding to a query window according to a raster data access request;
    calculating a sampling level according to the target pixel resolution and a stored pixel resolution of a raster object, and determining whether the sampling level is greater than a threshold; and
    accessing raster data corresponding to the query window according to a column-level index if the sampling level is greater than the threshold, the column-level index being an index generated by down-sampling according to raster data of the raster object in a column, wherein before executing the corresponding window query input to determine the target pixel resolution corresponding to the query window according to the raster data access request, the method further comprises performing a splicing operation on pixel matrices of a root node of a row-level index of the raster object, performing a down-sampling operation on an obtained splicing result matrix, and generating the column-level index according to a down-sampling result.

2. The method as recited in claim 1, wherein executing the corresponding window query input to determine the target pixel resolution corresponding to the query window according to the raster data access request comprises:
    executing the corresponding window query input to obtain a corresponding window field range and a number of pixels of the query window according to the raster data access request; and
    calculating the target pixel resolution corresponding to the query window based on the window field range and the number of pixels of the query window.

3. The method as recited in claim 1, wherein the threshold is a defined threshold, or the threshold is a number of levels of a row-level index generated according to the raster data of the raster object in a row.

4. The method as recited in claim 3, wherein when the threshold is the number of levels of the row-level index generated according to the raster data of the raster object in the row, the method further comprises:
    accessing the raster data corresponding to the query window according to the row-level index if the sampling level is less than or equal to the threshold and is not 0.

5. The method as recited in claim 1, wherein performing the splicing operation on the pixel matrices of the root node of the row-level index of the raster object, performing the down-sampling operation on the obtained splicing result matrix, and generating the column-level index according to the down-sampling result comprise:
    splicing the pixel matrices of the root node according to a spatial positional relationship between raster objects corresponding to the pixel matrices of the root node to obtain the splicing result matrix.

6. The method as recited in claim 5, wherein performing the splicing operation on the pixel matrices of the root node of the row-level index of the raster object, performing the down-sampling operation on the obtained splicing result matrix, and generating the column-level index according to the down-sampling result further comprise:
    performing a down-sampling operation with a down-sampling multiplying power of a defined multiplying power for the splicing result matrix, and generating the column-level index according to the down-sampling result.

7. An apparatus comprising:
    one or more processors;
    memory;
    a determination module stored in the memory and executable by the one or more processors to execute a corresponding window query input to determine a target pixel resolution corresponding to a query window according to a raster data access request;
    a judging module stored in the memory and executable by the one or more processors to calculate a sampling level according to the target pixel resolution and a stored pixel resolution of a raster object, and determine whether the sampling level is greater than a threshold;
    a first access module stored in the memory and executable by the one or more processors to access raster data corresponding to the query window according to a column-level index if the sampling level is greater than the threshold, the column-level index being an index generated by down-sampling according to raster data of the raster object in a column; and
    a column index generation module stored in the memory and executable by the one or more processors to perform a splicing operation on pixel matrices of a root node of a row-level index of the raster object, perform a down-sampling operation on an obtained splicing result matrix, and generate the column-level index according to a down-sampling result, before executing the corresponding window query input to determine the target pixel resolution corresponding to the query window according to the raster data access request.

8. The apparatus as recited in claim 7, wherein the determination module comprises:
    an acquisition module configured to execute the corresponding window query input according to the raster data access request to obtain a corresponding window field range and a number of pixels of the query window;
    a calculation module configured to calculate the target pixel resolution corresponding to the query window according to the window field range and the number of pixels of the query window.

9. The apparatus as recited in claim 7, wherein the threshold is a defined threshold, or the threshold is a number of levels of a row-level index generated according to the raster data of the raster object in a row.

10. The apparatus as recited in claim 9, wherein when the threshold is the number of levels of the row-level index generated according to the raster data of the raster object in the row, the apparatus further comprises:
a second access module configured to access the raster data corresponding to the query window according to the row-level index if the sampling level is less than or equal to the threshold and is not 0.

11. The apparatus as recited in claim 7, wherein the column index generation module comprises:
a splicing module configured to splice the pixel matrices of the root node according to a spatial positional relationship between raster objects corresponding to the pixel matrices of the root node to obtain the splicing result matrix.

12. The apparatus as recited in claim 7, wherein the column index generation module further comprises:
a down-sampling module configured to perform a down-sampling operation with a down-sampling multiplying power of a defined multiplying power for the splicing result matrix, and generating the column-level index according to the down-sampling result.

13. One or more non-transitory computer readable media storing executable instructions that, when executed by one or more processors, cause the one or more processors to perform acts comprising:
executing a corresponding window query input to determine a target pixel resolution corresponding to a query window according to a raster data access request;
calculating a sampling level according to the target pixel resolution and a stored pixel resolution of a raster object, and determining whether the sampling level is greater than a threshold; and
accessing raster data corresponding to the query window according to a column-level index if the sampling level is greater than the threshold, the column-level index being an index generated by down-sampling according to raster data of the raster object in a column, wherein before executing the corresponding window query input to determine the target pixel resolution corresponding to the query window according to the raster data access request, the acts further comprise performing a splicing operation on pixel matrices of a root node of a row-level index of the raster object, performing a down-sampling operation on an obtained splicing result matrix, and generating the column-level index according to a down-sampling result.

14. The one or more non-transitory computer readable media as recited in claim 13, wherein executing the corresponding window query input to determine the target pixel resolution corresponding to the query window according to the raster data access request comprises:
executing the corresponding window query input to obtain a corresponding window field range and a number of pixels of the window according to the raster data access request; and
calculating the target pixel resolution corresponding to the query window based on the window field range and the number of pixels of the query window.

15. The one or more non-transitory computer readable media as recited in claim 13, wherein the threshold is a defined threshold, or the threshold is a number of levels of a row-level index generated according to the raster data of the raster object in a row.

16. The one or more non-transitory computer readable media as recited in claim 15, wherein when the threshold is the number of levels of the row-level index generated according to the raster data of the raster object in the row, the acts further comprise:
accessing the raster data corresponding to the query window according to the row-level index if the sampling level is less than or equal to the threshold and is not 0.

17. The one or more non-transitory computer readable media as recited in claim 13, wherein performing the splicing operation on the pixel matrices of the root node of the row-level index of the raster object, performing the down-sampling operation on the obtained splicing result matrix, and generating the column-level index according to the down-sampling result comprise:
splicing the pixel matrices of the root node according to a spatial positional relationship between raster objects corresponding to the pixel matrices of the root node to obtain the splicing result matrix; and
performing a down-sampling operation with a down-sampling multiplying power of a defined multiplying power for the splicing result matrix, and generating the column-level index according to the down-sampling result.

* * * * *